United States Patent [19]

Scheffel

[11] Patent Number: 4,659,061
[45] Date of Patent: Apr. 21, 1987

[54] SEAL RING SHUTOFF STEM TIP

[75] Inventor: Gary W. Scheffel, Streetsboro, Ohio

[73] Assignee: Nupro Company, Willoughby, Ohio

[21] Appl. No.: 787,689

[22] Filed: Oct. 15, 1985

[51] Int. Cl.$^4$ ............................................. F16K 1/36
[52] U.S. Cl. ................................. 251/332; 251/210; 251/900
[58] Field of Search .............. 251/210, 332, 334, 187, 251/900

[56] References Cited

U.S. PATENT DOCUMENTS

| 117,689 | 8/1871 | Russell . |
| 1,301,278 | 4/1919 | Labus . |
| 2,351,190 | 6/1944 | Carlson . |
| 2,414,908 | 1/1947 | Smith . |
| 2,885,176 | 5/1959 | Bryant . |
| 2,936,154 | 5/1960 | Von Platen et al. . |
| 3,084,903 | 4/1963 | Parks . |
| 3,829,062 | 8/1974 | Fend . |
| 3,960,364 | 6/1976 | Hargrave . |
| 4,119,296 | 10/1978 | Scapes . |
| 4,204,561 | 5/1980 | Ludwig ............................ 251/332 X |
| 4,228,987 | 10/1980 | Potter . |

FOREIGN PATENT DOCUMENTS

| 230245 | 2/1959 | Australia . |
| 96717 | 8/1963 | Denmark . |
| 442178 | 3/1912 | France . |
| 195927 | 5/1965 | Sweden . |
| 630262 | 10/1949 | United Kingdom . |
| 893870 | 4/1962 | United Kingdom . |
| 585361 | 12/1977 | U.S.S.R. . |

Primary Examiner—Arnold Rosenthal
Attorney, Agent, or Firm—Fay, Sharpe, Fagan, Minnich & McKee

[57] ABSTRACT

A stem tip seal for a shutoff valve includes a valve member having an axial recess at the outer end that operatively receives a retaining sleeve. The retaining sleeve includes a flange portion engaging a shoulder formed by a circumferential groove in the valve member to effectively limit relative movement between these two components. A tapered surface at one end of the retaining sleeve cooperates with a tapered surface formed on the valve member for confining a seal ring. The seal ring is under compression and biases the retaining sleeve toward a first or outer limit position. Initial contact between the retaining sleeve and valve seat prevents nibbling or chipping of the seal ring during valve closure, and extended contact between the retaining sleeve and valve seat provides support during valve opening to prevent seal blow out.

19 Claims, 4 Drawing Figures 4,659,061

SEAL RING SHUTOFF STEM TIP

BACKGROUND OF THE INVENTION

This invention pertains to the art of valves and, more particularly, to shutoff valves.

The invention is particularly applicable to a fluid pressure actuated shutoff valve and will be described with particular reference thereto. However, it will be appreciated that the invention has broader applications and may advantageously be employed in other valve and related environments.

Shutoff valves conventionally employ a construction in which a valve member is selectively movable axially toward and away from a stationary valve seat to selectively control fluid flow through a valve. Actuation of the valve member may be manual or, alternatively, may be effected by power means. System fluid pressures and economics dictate whether manual or power actuated shutoff valves are used.

Typically, a soft or yielding material is provided on the end of the valve stem for sealing cooperation with a metal valve seat. Contact between the resilient material and metal ensures a tight sealing fit between the coacting members. In addition, use of a resilient material can withstand repeated valve openings and closings, even though the material is subjected to gradual wearing or deterioration. The resilient material causes little, if any, galling action on the valve seat, so continued sealing is readily achieved. In addition, a resilient seal can adapt to the presence of particulate matter in the system fluid while maintaining a tight seal.

Leakage around the valve tip seal is of primary concern with shutoff valves and is normally encountered after extended valve use. One type of prior art valve employs a stem tip in which a soft sealing material is bonded to the outer end of the stem. Repeated opening and closing of the valve exerts a spring force which causes the bond and seal to break down. Another prior art shutoff valve construction positions a seal ring in an annular groove formed in the end of the valve member. Nibbling or chipping and blow out of the seal ring are problems which are encountered as system fluid pressures increase.

In view of the foregoing difficulties, it has been considered desirable to develop a new stem tip arrangement for providing sealing action capable of extended use without encountering failure, blow out, and the like. The invention of the subject application is believed to successfully and economically meet these needs and others.

SUMMARY OF THE INVENTION

In accordance with the present invention, a stem tip seal for a shutoff valve or the like includes a seal member adapted to operatively engage an associated valve seat. The seal member is interposed between a valve member and a retaining sleeve, and the retaining sleeve is adapted for limited movement relative to the valve member. The retaining sleeve includes a first seal surface engageable with the valve seat in response to movement of the valve member. The seal member is confined between the valve member and retaining sleeve by a pair of tapered surfaces disposed in spaced apart facing relation to each other. One of these surfaces is on the valve member and the other is on the retaining sleeve.

In accordance with another aspect of the invention, a peripheral groove on the valve member cooperates with a portion of the retaining sleeve to limit at least outward axial movement of the sleeve relative to the valve member.

According to another aspect of the invention, the seal member biases the retaining sleeve toward a first or outer engaging position extending beyond the outer end surface of the valve member.

In accordance with a more limited aspect of the invention, the seal member comprises an O-ring compressibily received between the valve member and retaining sleeve. Compression of the O-ring is such that a biasing force is continuously exerted against the retaining sleeve.

A principal advantage of the subject invention is the provision of a seal arrangement that eliminates or at least significantly reduces the potential for experiencing blow out or nibbling of the resilient seal member.

Another advantage resides in an arrangement for effectively confining a seal member in the stem tip of a shutoff valve.

A further advantage of the invention is found in eliminating the need for separate biasing members to urge the valve into a sealing condition.

Still other advantages and benefits of the invention will become apparent to those skilled in the art upon a reading and understanding of the following detailed description.

BRIEF DESCRIPTION OF THE DRAWINGS

The invention may take form in certain parts and arrangements of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
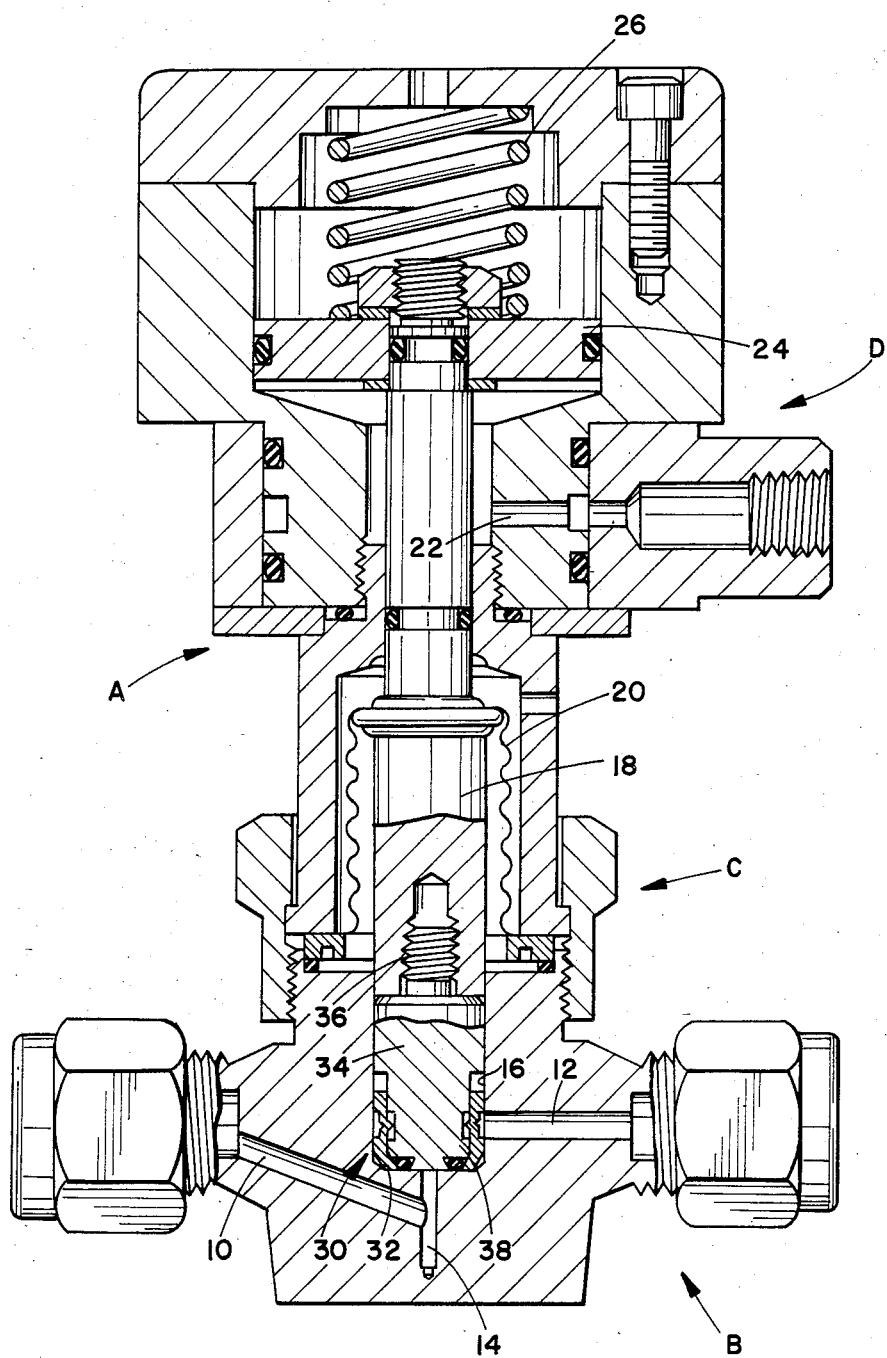
FIG. 1 is a cross-sectional view of a fluid pressure actuated shutoff valve incorporating a stem tip seal formed in accordance with the subject invention.

Referring now to the drawings wherein the showings are for purposes of illustrating the preferred embodiment of the invention only and not for purposes of limiting same, FIG. 1 shows a shutoff valve assembly A comprised of a valve body B closed at its upper end by a bonnet assembly C which, in turn, carries an actuator assembly D.

As shown, valve body B includes a first or inlet branch 10 and a second or outlet branch 12. Suitable end fittings are provided at opposite ends of valve body B in surrounding relation to the outer ends of the inlet and outlet branches for connection with an external fluid system or piping as is known. An internal passage 14 extends in communicating relation between the inlet branch 10 and a valve chamber 16 which, in turn, is in fluid communication with outlet branch 12. The valve chamber is adapted to closely receive the lower end of a valve stem 18 which, as illustrated, is sealed through use of a bellows 20. Those skilled in the art will recognize that seal members such as diaphragms or the like may be used as alternatives. Also, and as is known in the art, valve stem 18 may be selectively reciprocated between valve open and closed positions by means of actuator assembly D.

As shown in FIG. 1, the valve is controlled by a fluid pressure actuator. In the actuator, a fluid inlet passage 22 provides entry for pressurized fluid, such as air, for causing movement of actuator piston 24 against a predetermined biasing force of spring 26 for shifting stem 18 into the valve open position. Removal of the fluid pressure allows the spring biasing means to move the valve stem back to the normally closed position. It is to be understood that the subject invention is also applicable to use with other types of actuators, both automatic and manual, without in any way departing from the spirit and intent thereof. Moreover, the structure and function of the remaining elements of the shutoff valve itself are conventional in the art so that further discussion is deemed unnecessary to a full and complete understanding of the invention.

Figure 2:
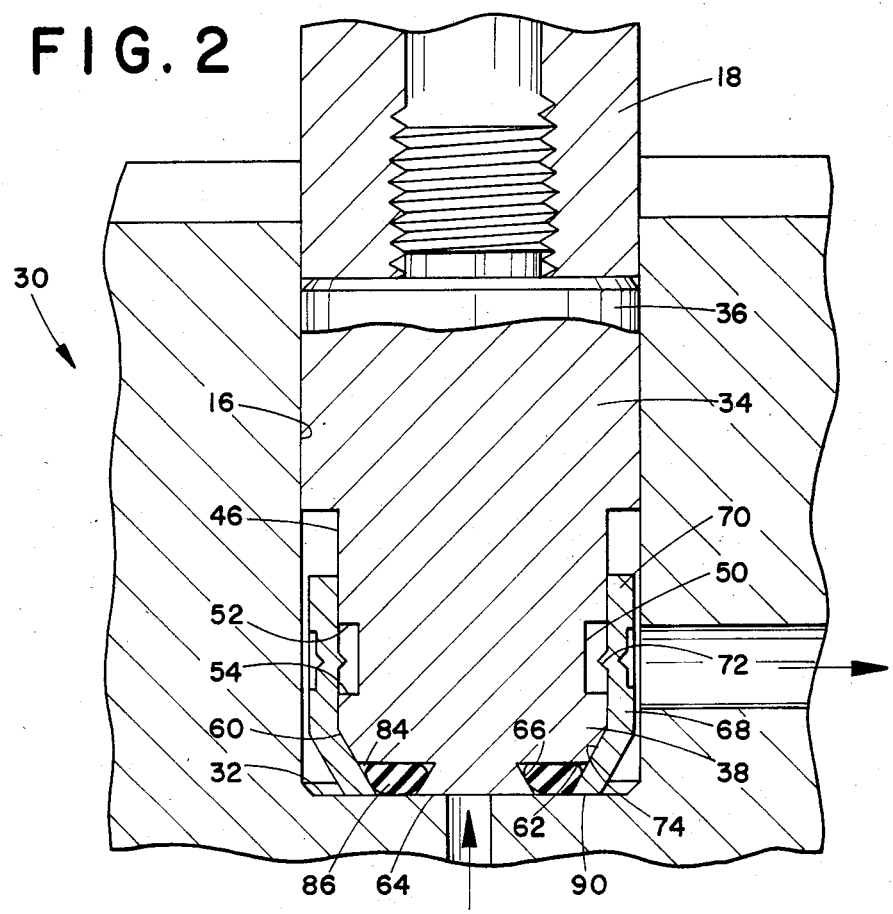
FIG. 2 is an enlarged view of the stem tip portion of FIG. 1 in the valve closed position.

Of importance to the subject invention is the arrangement of the stem tip seal assembly 30. As best shown in FIG. 2, assembly 30 is carried on the outer or lower end of the valve stem 18 and is illustrated in its closed, sealing position with a planar valve seat 32. The tip seal assembly is shown as including a generally cylindrical adapter to tip body member 34 threadedly mounted at end 36 to the valve stem 18. The other end 38 of the adapter forms the stem tip sealing end.

Adapter 34 is dimensioned for close sliding receipt in valve chamber 16 and includes a first recess or area of reduced diameter 46 extending axially therealong from end 38. A band-like second recess or groove 50 extends into first recess 46 in a peripherally surrounding relationship therewith. One side wall of groove 50 defines a first or upper shoulder 52 and the other side wall defines a second or lower shoulder 54. Shoulders 52, 54 define a pair of limit stops whose function will subsequently be described.

Adapter 34 further includes a side wall portion 60 which tapers inwardly from recess 46 to an annular end face 62. End face 62, in turn, has a centrally located adapter stop face 64 extending axially outward therefrom. End and stop faces 62, 64 are interconnected by a continuous band-like surface 66 which tapers radially outward from face 62 toward face 64.

A generally cylindrical retaining sleeve 68 is closely slidably carried on the cylindrical exterior surface of the adapter first recess 46. As illustrated in FIG. 2, the retaining sleeve has a first or upper end 70 cooperable with the surface of the first recess and a retaining flange or protrusion 72 extending radially inward therefrom into the second recess or groove 50 of the adapter member. The flange 72 may comprise a continuous circumferential indentation formed by convenient means such as crimping or the like, or may alternatively take form as a plurality of circumferentially spaced members or segments. The flange portion cooperates with at least the lower limit stop 54 defined by groove 50 to effectively limit axial outward movement of the sleeve relative to the adapter. As illustrated in the valve closed position of FIG. 2, the upper limit stop 52 does not come into play in controlling or limiting the retaining sleeve; however it is to be understood that in alternative valve constructions or in other applications, the upper limit stop may be employed to determine the extent of axially inward movement of the retaining sleeve relative to the adapter.

The lower end portion 74 of the retaining sleeve tapers radially inward at substantially the same angle as adapter member side wall portion 60 and at substantially the same taper angle as band-like surface 66. When the stem tip seal is assembled, the tapered surfaces 66, 74 of the adapter and retaining sleeve in conjunction with the annular end face 62 define a generally trapezoidal cavity 84 adapted to receive a seal member 86.

Figure 3:
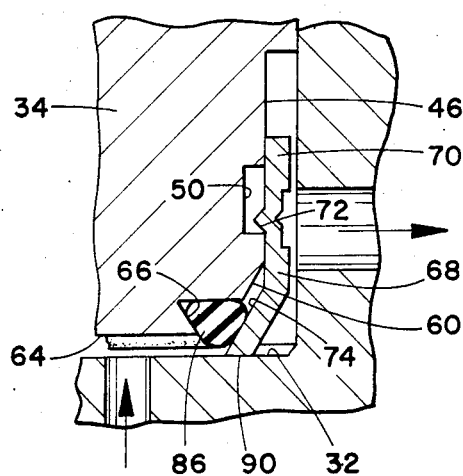
FIG. 3 is a detailed view of the right hand side of the stem tip of FIG. 2 illustrating the disposition of the elements just prior to valve closure; and, FIG. 4 illustrates the nibbling or blow out problems of a seal ring associated with prior conventional stem tip seals.

The seal member 86 could have many different conformations within the spirit of the subject invention, but in the preferred embodiment, an O-ring formed of a soft or resilient sealing material such as "Viton" (a registered trademark of E.I. DuPont de Nemours & Co., Inc.) is advantageously employed. "Viton" has the additional advantage of eliminating cold flow problems associated with other resilient sealing materials. The O-ring is sized such that when it is installed in cavity 84, it is placed under compression and distorted from its normal or unstressed circular cross-section. Such distortion is generally illustrated in FIG. 3. Moreover, when the stem is moved to the valve closed position of FIGURE 2, the O-ring sealingly engages the valve seat 32 and is further deformed in cavity 84.

With particular reference to FIG. 3, the positioning of the stem tip elements is shown just prior to valve closing. The adapter 34 is slightly spaced from the valve seat 32 while the flange portion 74 of the retaining sleeve is moved to engagement with the lower shoulder or limit stop 54 under the biasing influence of compressed O-ring seal 86. The outer terminal end 90 of sleeve lower end portion 74 extends outwardly beyond stop face 64 into abutting relation with the valve seat 32. Thus, initial sealing and engagement of the valve seat upon valve closure is through retaining sleeve 68. Continued downward movement of the adapter member 34 toward the valve seat further compresses the seal member 86 so that it ultimately sealingly engages the valve seat at a annular area disposed radially inward of the retaining sleeve outer terminal end 90. Lastly, the stop face 64 engages the valve seat to prevent further downward movement of the stem tip seal assembly. Of course, during the downward movement of the adapter member, sleeve 68 remains stationary, i.e., the adapter member moves relative to the retaining sleeve.

When the valve is fully closed as shown in FIG. 2, O-ring 86 is closely confined and compressed between four separate planar surfaces, namely, tapered surfaces 66, 74, end face 62, and valve seat 32. The O-ring retains a generally rounded conformation due to the presence of these spaced circumferential compression surfaces. This promotes a longer O-ring life since extreme distortions are averted.

Figure 4:
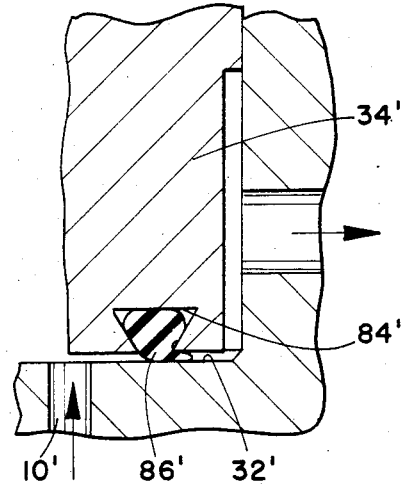

FIG. 4 illustrates the problems associated with prior art shutoff valves. For ease of illustration, like elements are identified by like numerals with a primed (') suffix and new elements are identified by new numerals. A generally annular cavity 84' is formed in a radially extending end face of the valve member or adapter 34'. Insertion of a seal member such as O-ring 86' into the cavity provides a fluid tight seal as is well known. Fluid pressure from the inlet branch 10' is exerted on a radial inner portion of the O-ring, thus urging a portion of the O-ring radially outward toward the exterior side wall surface of the adapter. Further downward movement of the adapter toward the valve seat 32' during closing nibbles or chips the O-ring. Repeated opening and closing of the valve member under such conditions results in a gradual deterioration of the O-ring. Eventually, the O-ring is prevented from making an effective seal with the valve seat.

Another problem associated with prior art devices of the type generally depicted in FIG. 4 occurs during opening of the valve from a closed position. Upward movement of the adapter 34' from the valve seat disengages the adapter end face from the valve seat 32' while the O-ring 86' remains in sealing contact therewith. In this position, fluid pressure from the valve inlet branch 10' can cause blow out of the O-ring seal member since there is no outer radial support therefor.

The advantages of the subject new stem tip seal are apparent when compared against certain problems encountered in the prior art structures. Closure of the valve member toward the valve seat produces an initial metal to metal contact between the retaining sleeve 68 and the valve seat 32. The outward biasing force provided by the O-ring 86 on the retainer sleeve 70 assures the bottoming of the retaining sleeve on the valve seat with each downward closure movement. Further downward movement compresses the O-ring against the valve seat to form a leak tight seal. The tapered surfaces 66, 74 also contain the O-ring within cavity 84, thus minimizing the possibility of nibbling or chipping of the O-ring. Additionally, once the valve is in a closed position, reopening of the valve has less chance of causing O-ring blow out since the retaining sleeve provides desirable outer radial support.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A stem tip seal for a shutoff valve comprising:
a valve member having a first surface adapted of selective abutting engagement with an associated valve seat;
a retaining sleeve received by said valve member having a first seal surface adapted for cooperative sealing engagement with the associated valve seat, said retaining sleeve being axially movable relative to said valve member in response to movement of said valve member toward and away from engagement with the associated valve seat;
a seal member interposed between said valve member and said retaining sleeve defining a second seal surface, said seal member exerting a biasing force urging said retaining sleeve first seal surface to a position interposed between the valve member first surface and the associated valve seat and said second seal surface being biased to an axial position between said valve member first surface and the associated valve seat whereby said first seal surface and said second seal surface are adapted for sealing engagement with the associated valve seat before the valve member first surface abuttingly engages the associated valve seat; and,
said valve member and said retaining sleeve each having a tapered surface, said tapered surfaces being in spaced-apart facing relation and defining a cavity for confiningly receiving said seal member.

2. The stem tip seal as defined in claim 1 further including limiting means interposed between said valve member and said retaining sleeve for establishing a first limit of axial movement therebetween in at least one direction.

3. The stem tip seal as defined in claim 2 wherein said limiting means comprises a groove in one of said valve member and said sleeve which receives a radial protrusion on the other of said valve member and sleeve, said groove including a wall which defines a positive stop surface for said protrusion in one direction of axial movement between said valve member and said sleeve.

4. The stem tip seal as defined in claim 3 wherein said groove extends peripherally around said valve member.

5. The stem tip seal as defined in claim 2 wherein said protrusion comprises a radial flange portion on said sleeve.

6. The stem tip seal as defined in claim 5 wherein said flange portion is defined by a continuous section of said sleeve.

7. The stem tip seal as defined in claim 2 wherein said first limit positions said retaining sleeve in an outermost axial relation to said valve member extending beyond said valve member first surface whereby initial engagement between said tip seal and the associated valve seat during valve closure occurs at said retaining sleeve.

8. The stem tip seal as defined in claim 1 wherein said seal member comprises an annular member confined under compression between said valve member and said retaining sleeve, said seal member exerting a biasing force urging said retaining sleeve to an outermost axial position relative to said valve member.

9. The stem tip seal as defined in claim 8 wherein said seal member comprises an O-ring constructed of a resiliently deformable material.

10. A shutoff valve tip seal comprising:
a valve member having a generally planar end face;
a retaining sleeve disposed in surrounding relation with and axially movable relative to said valve member, said retaining sleeve having a first seal surface; and,
a seal member interposed and compressingly confined between said valve member and said retaining sleeve defining a second seal surface, said seal member exerting a biasing force urging said retaining sleeve to a first limit position wherein said first seal surface extends axially outward beyond said valve member planar end face whereby said first seal surface is adapted for initial engagement with an associated valve seat as said valve member is moved toward a closed position, said tip seal thereafter progressively engaging the associated valve seat at said second seal surface and then at said valve member planar end face, said planar end face defining a limit stop to prevent further axial movement of said valve member toward the associated valve seat.

11. The seal tip as defined in claim 10 further including means for limiting axial movement of said retaining sleeve relative to said valve member.

12. The seal tip as defined in claim 11 wherein said limiting means comprises stop means cooperably interposed between said retaining sleeve and said valve member for positively defining at least one end position of relative axial movement between said sleeve and said valve member.

13. The seal tip as defined in claim 11 wherein said limiting means comprises a groove in said valve member receiving a radial protrusion on said retaining sleeve, one side wall of said groove being selectively cooperable with said protrusion for defining a positive stop surface.

14. The seal tip as defined in claim 10 wherein said retaining sleeve includes an end portion cooperable with said valve member for confining said seal member therebetween.

15. The seal tip as defined in claim 10 wherein said retaining sleeve and said valve member include tapered surfaces in spaced apart facing relation for compressingly confining said seal member therebetween.

16. A seal tip for a shut-off valve comprising:
   a valve member having a peripheral groove formed therein;
   a generally cylindrical retaining sleeve operatively engaged with said groove for limited axial movement relative to said valve member;
   a seal member compressingly confined between said valve member and said retaining sleeve, said seal member exerting a biasing force urging said retaining sleeve to an axially outer first limit position relative to said valve member;
   a tapered surface formed on each of said retaining sleeve and said valve member, said tapered surfaces in facing, confining relation with said seal member; and,
   said retaining sleeve biased toward said first limit position during valve closure for initially engaging the associated valve seat along a first radially outer planar surface; continued closing of said valve moving said retaining sleeve relative to said valve member, said seal member then operatively engaging the associated valve seat along a second radially intermediate planar surface, and lastly, said valve member engaging the associated valve seat along a third radially inner planar surface whereby blow out or chipping of the seal member is reduced.

17. The seal tip as defined in claim 16 wherein said retaining sleeve includes a circumferential protrusion portion cooperating with said groove and defining said first limit position of said retaining sleeve movement.

18. The seal tip as defined in claim 16 wherein said retaining sleeve extends axially outward from said seal member in a first valve open position, said valve member moving relative to said retaining sleeve during valve closure to a second valve closed position, said seal member further compressed in sealing engagement with the associated valve seat in said second valve closed position.

19. A stem tip seal for a shutoff valve comprising:
   a valve member having a first surface adapted for selective abutting engagement with an associated valve seat;
   a retaining sleeve received by said valve member having a first seal surface adapted for cooperative sealing engagement with the associated valve seat, said retaining sleeve being axially movable relative to said valve member in response to movement of said valve member toward and away from engagement with the associated valve seat;
   a seal member interposed between said valve member and said retaining sleeve defining a second seal surface adapted for selective sealing engagement with the associated valve seat;
   limiting means interposed between said valve member and said retaining sleeve for establishing a first limit of axial movement therebetween in at least one direction, said first limit positioning said retaining sleeve in an outermost axial relation relative to said valve member extending beyond said valve member first surface whereby initial engagement between said tip seal and the associated valve seat during valve closure occurs at said retaining sleeve; and,
   said valve member and said retaining sleeve each having a tapered surface, said tapered surfaces being in spaced apart facing relation and defining a cavity for confiningly receiving said seal member.

* * * * *